Jan. 26, 1954
C. W. SHAFER
2,666,984
PIPE CUTTER WITH ROTARY CUTTER
Filed Sept. 15, 1951
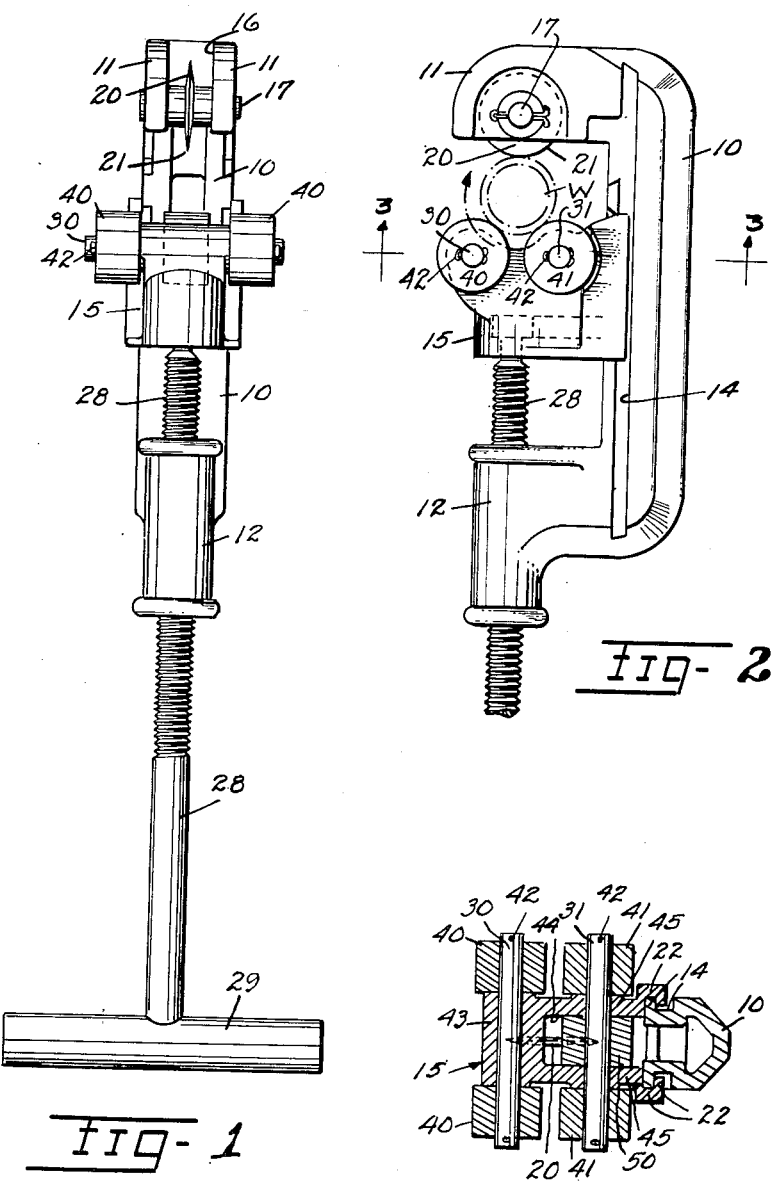
INVENTOR.
CLARENCE W. SHAFER
BY
Bates, Teare, & McDean
ATTORNEYS Patented Jan. 26, 1954

2,666,984

UNITED STATES PATENT OFFICE 2,666,984

PIPE CUTTER WITH ROTARY CUTTER

Clarence W. Shafer, Warren, Ohio, assignor to Beaver Pipe Tools, Inc., Warren, Ohio, a corporation of Ohio Application September 15, 1951, Serial No. 246,799

1 Claim. (Cl. 30—102)

This invention relates to improvements in and relating to tools for cutting pipe, rods and the like, and especially to an improved pipe cutter which may be used either as a hand tool or in connection with a power-driven work-supporting and rotating mechanism. More particularly, the present invention is concerned with the provision of an improved guiding mechanism for a conventional pipe cutter. These, therefore, are the general objects of the present invention.

Generally, the conventional pipe cutter comprises a frame having a fixed jaw at one end thereof, and a movable jaw slidably mounted thereon for movement to and from the fixed jaw. A cutter is mounted in one of these jaws and a non-cutting pipe-engaging member in the other. The cutter generally comprises a rotatable sharpened edge wheel, and the pipe-engaging member usually consists of a pair of spaced rollers mounted in the plane of the cutting tool on spaced axes which are parallel with the axes of the cutting tool. Generally a hand-operated screw is provided to position the movable jaw and to act as a handle for the tool.

Although pipe cutters of the type above-mentioned are in general use, considerable difficulty has been encountered in maintaining the cutter at right angle to the work to avoid cutting helical grooves in the work as the tool is swung about the work axis. The tendency to cut helical grooves is greatly increased when the cutter is used in connection with a power drive mechanism which rotates the work while the handle of the tool rests against a stationary abutment to insure relative rotation between the tool and the work.

A specific object of the present invention is to provide an improved type or work-engaging member, which will prevent the cutting of helical grooves in the work and, at the same time, efficiently roll down any external burr formed on the work piece by the cutting action.

Other objects and advantages of this invention will become more apparent from the following description relating to an embodiment of the invention which is illustrated in the accompanying drawings. The essential features of the invention will be summarized in the claim.

According to the invention, a cutting wheel is mounted on a shaft or rod carried by one of the jaws with its axis in a predetermined plane, and a pair of roller shafts mounted to the other jaw with their axes parallel with the spaced equidistant from the axis of the cutting wheel. Each of the last named shafts are provided with a pair of work-engaging rollers which are spaced from each other and from the plane of the cutting wheel. One of these shafts has a third or burr-engaging roller positioned intermediate its other two rollers, and in the plane of the cutting wheel. The portions of the pipe cutter extending between the two rollers of the other roller shaft is relieved to prevent engagement of the work throughout such portion of the tool. Further, according to the invention, the roller supporting shafts are positioned in the movable jaw, and the burr-engaging roller is placed on the trailing shaft namely the shaft adjacent the frame of the tool.

In the drawings, Fig. 1 is a plan view of the improved pipe cutter; Fig. 2 is a side view of the cutter, a portion of the handle being broken away; and Fig. 3 is a sectional view, the plane of which is indicated by the lines 3—3 on Fig. 2.

As illustrated in the drawings, the cutter comprises an elongated frame 10 having a fixed jaw 11 extending outward at one end thereof, and a boss 12 extending outward at its other end in alignment with the jaw and spaced therefrom. The frame is provided with a guideway 14 in which a movable jaw 15 is mounted. The movable jaw is slidably mounted in the guideway for movement between the fixed jaw 11 and the boss 12. The fixed jaw 11 is provided with a centrally located slot 16 and carries a pin 17 which extends thereacross. Rotatably mounted on this pin, which is secured to the jaw, is a cutting wheel 20, so arranged that its peripheral cutting edge 21 projects outward from the jaw 11 over the frame 10 and toward the movable jaw 15.

The guideway 14 comprises tongue and groove formations which extend along either side of the frame 10 and which are engaged by a coacting tongue and groove formations carried by the movable jaw 15 and generally indicated at 22. A suitably threaded rod 28 is threadingly mounted in the boss 12 and is rotatably secured to the movable jaw 15 in the well known manner. This rod is provided with a handle in the form of a cross bar 29 to enable it to be rotated to move the jaw 15 to and from the cutting wheel 20 and to facilitate manual rotation of the tool about the axis of the work. The rod itself may engage a fixed abutment to hold the tool against rotation when the work is rotated by a power drive mechanism.

The non-cutting pipe engaging members with which the present invention is particularly concerned are mounted in the movable jaw which, generally speaking, is of substantially the same width as the frame 10. A pair of shafts or rods 30 and 31 are rotatably mounted in the movable jaw 15 with their axes parallel with the axis of the cutting wheel 20. These rods 30 and 31 are spaced equi-distant from the cutting wheel 20 and from the axis projected of the threaded rod 28 which intersects the axis of the cutting wheel 20. The rods 30 and 31 extend outward beyond the sides of the movable jaw 15 a distance sufficient to support guide rollers 40 and 41. One guide roller 40 is positioned on each end of the shaft or rod 30 while the rollers 41 are positioned on respective ends of the shaft 31. These rollers 40 and 41 are rotatably mounted on their respective shafts and are held in position thereon as for instance by cotter pins 42.

The shaft 30, mainly the shaft farthest away from the frame 10 passes through a boss-like portion 43 of the movable jaw 15 which spans the space between the rollers 40 of such shaft. This boss-like portion has a radius which is smaller than that of the rollers 40 so as to insure clearance between it and the work or any burr formed on the work as a result of the cutting action.

The portion of the movable jaw 15 intermediate the rollers 41 of the shaft 31 is provided with a recess 44 which is spaced from the rollers 41 by web portions 45 of the jaw. A roller 50 is rotatably mounted on the shaft 31 in the recess 44 between the web portions 45 of the jaw. This roller is of the same diameter as the rollers 40 and 41 heretofore described and serves to roll down any burr which may be formed on the pipe as a result of the cutting action.

When in use the pipe cutter is generally rotated relative to the work W by swinging it in the direction of the arrow shown in Fig. 2 and when the pipe cutter remains stationary and the work is rotated, such rotation is in a counter-clockwise direction. Accordingly, the rollers 40 on the external shaft 30 are the leading rollers, and play a more important part in the guiding of the tool relative to the work than do the rollers 41 on the trailing shaft 31. The portions of the tool intermediate the rollers 40 on the leading shaft 30 are relieved so that any burr resulting from the cutting action passes freely between the leading rollers 40 and hence does not interfere with the guiding action of these rollers. This burr is subsequently rolled down by the roller 50 on the shaft 31. While the rollers 41 on the forward or leading shaft 30 are highly important in guiding the cutter along the pipe to prevent the cutting of a spiral groove, the rollers 41 on the shaft 31 also play an important part in the guiding operation. The rollers 41 prevent rocking of the tool which otherwise might result from contact between the intermediate roller 40 and the burr resulting from the cutting action. Accordingly, it has been found to be highly essential that there be provided four external rollers which are positioned out of the plane of the cutting wheel and the leading pair of which are separated by a portion of the tool which is undercut to permit free passage of the burr between such rollers, which burr is rolled down by a roller positioned intermediate the trailing pair of guiding rollers 41. Such arrangement has been found highly advantageous particularly on work such as pipe, the external surfaces of which may be slightly irregular.

I claim:

A pipe cutting tool having an elongated frame, a jaw fixed to one end of the frame, a boss fixed to the other end of the frame and spaced from the fixed jaw, a movable jaw mounted on said frame for movement between the boss and the fixed jaw, a threaded rod extending through said boss and projecting toward the fixed jaw, a connection between the rod and said movable jaw whereby the movable jaw may be moved to and from the fixed jaw, a cutting wheel rotatably mounted in the fixed jaw with its axis extending normal to and intersecting the axis of the threaded rod and adapted to rotate consequent upon the swinging of the tool about a workpiece, said cutting wheel projecting from the fixed jaw toward the movable jaw, a pair of rods journalled in the movable jaw with their axes parallel with the axis of the cutting wheel, and spaced an equal distance therefrom, one of said rods being adjacent the frame and the other spaced outward therefrom, a pair of rollers mounted on the external ends of said last named rod at either side of said jaw, said rollers being spaced by a portion of said jaw having a diameter less than that of the rollers to provide a space between said rollers for the free passage of any burr resulting from the cutting action, a second pair of rollers mounted externally of the movable jaw on the other of said rods and being spaced from each other and from the first main pair of rollers, a fifth roller mounted on said last named rod intermediate the first main rollers to roll down any burr resulting from the cutting action.

CLARENCE W. SHAFER.

References Cited in the file of this patent
UNITED STATES PATENTS

| Number | Name | Date |
| --- | --- | --- |
| 76,729 | Galleford | Apr. 14, 1868 |
| 575,688 | Brockett | Jan. 26, 1897 |
| 1,215,120 | Cramer | Feb. 6, 1917 |
| 1,215,121 | Cramer | Feb. 6, 1917 |
| 2,556,974 | Nye | June 12, 1951 |